J. HUGHES, W. O. TRAVIS AND R. A. STURGEON.
METHOD OF AND MEANS FOR THE CENTRIFUGAL SEPARATION OF SOLID SUBSTANCES FROM LIQUIDS.
APPLICATION FILED OCT. 9, 1914.

1,303,203.

Patented May 6, 1919.
3 SHEETS—SHEET 1.

Witnesses
M. E. McDade

Inventors
John Hughes
William O. Travis
Robert A. Sturgeon
by James L. Norris
Attorney J. HUGHES, W. O. TRAVIS AND R. A. STURGEON.
METHOD OF AND MEANS FOR THE CENTRIFUGAL SEPARATION OF SOLID SUBSTANCES FROM LIQUIDS.
APPLICATION FILED OCT. 9, 1914.

1,303,203.

Patented May 6, 1919.

Witnesses
M. E. McDade

Inventors
John Hughes
William O. Travis
Robert A. Sturgeon
by
Attorney

UNITED STATES PATENT OFFICE.

JOHN HUGHES, OF LONDON, AND WILLIAM OWEN TRAVIS, OF HAMPTON, ENGLAND, AND ROBERT ALEXANDER STURGEON, OF BODEURON, WALES.

METHOD OF AND MEANS FOR THE CENTRIFUGAL SEPARATION OF SOLID SUBSTANCES FROM LIQUIDS.

1,303,203.     Specification of Letters Patent.     Patented May 6, 1919.

Application filed October 9, 1914. Serial No. 865,897.

*To all whom it may concern:*

Be it known that we, JOHN HUGHES, WILLIAM OWEN TRAVIS, and ROBERT ALEXANDER STURGEON, subjects of the King of Great Britain, residing at 16 Victoria street, London, England, Manor House, Hampton, Middlesex, England, and Bodeuron, Trevor, North Wales, respectively, have invented a certain new and useful Improved Method of and Means for the Centrifugal Separation of Solid Substances from Liquids, of which the following is a specification.

This invention relates to the centrifugal separation of solids from liquids and it has for its object an improved method of and means for effecting the separation and the consolidation and ejection of such solid substances in continuously repeated cycles without stopping the machine.

According to the invention the separation and the consolidation and ejection of the solid substances are effected by utilizing the pressure produced in liquids when subjected to centrifugal force.

To this end a centrifuge is constructed with one part that is adapted to be moved relatively to the remainder of the machine by means of the pressure set up by centrifugal force in bodies of liquids admitted to spaces between said movable part and the other part of the machine.

One body of liquid is that to be centrifugalized, and when admitted the pressure set up therein by centrifugal force causes said movable part to be moved and to produce the necessary centrifgualizing space.

The other body of liquid which is for the purpose of reversing the direction of movement of the movable part, is admitted thereto until its pressure preponderates over that of the contents of the machine, thereby effecting the reduction of said centrifugalizing space and the separate expulsion of the solid and liquid contents.

Figure 1:
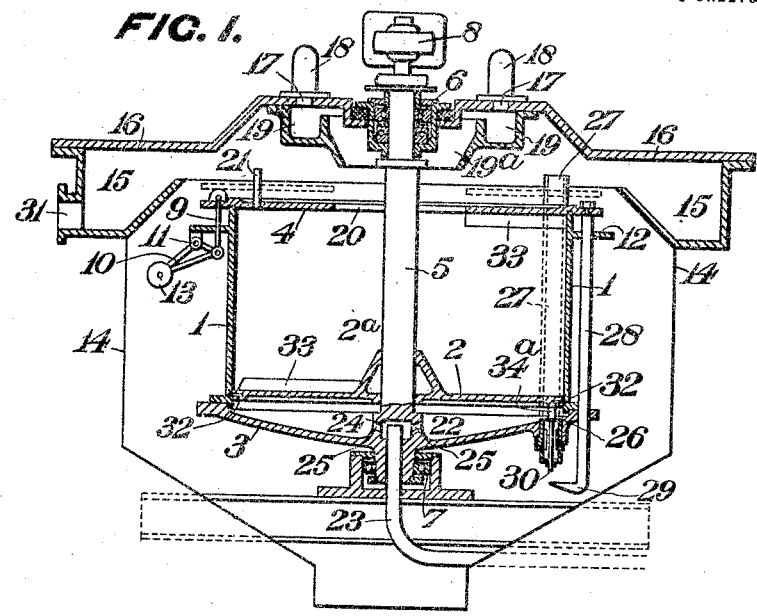
Figure 2:
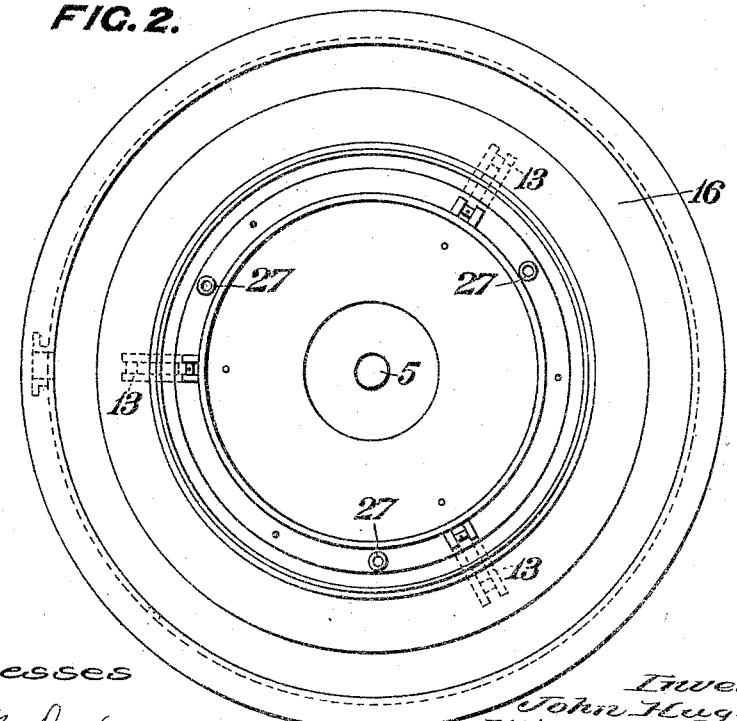
Figure 3:
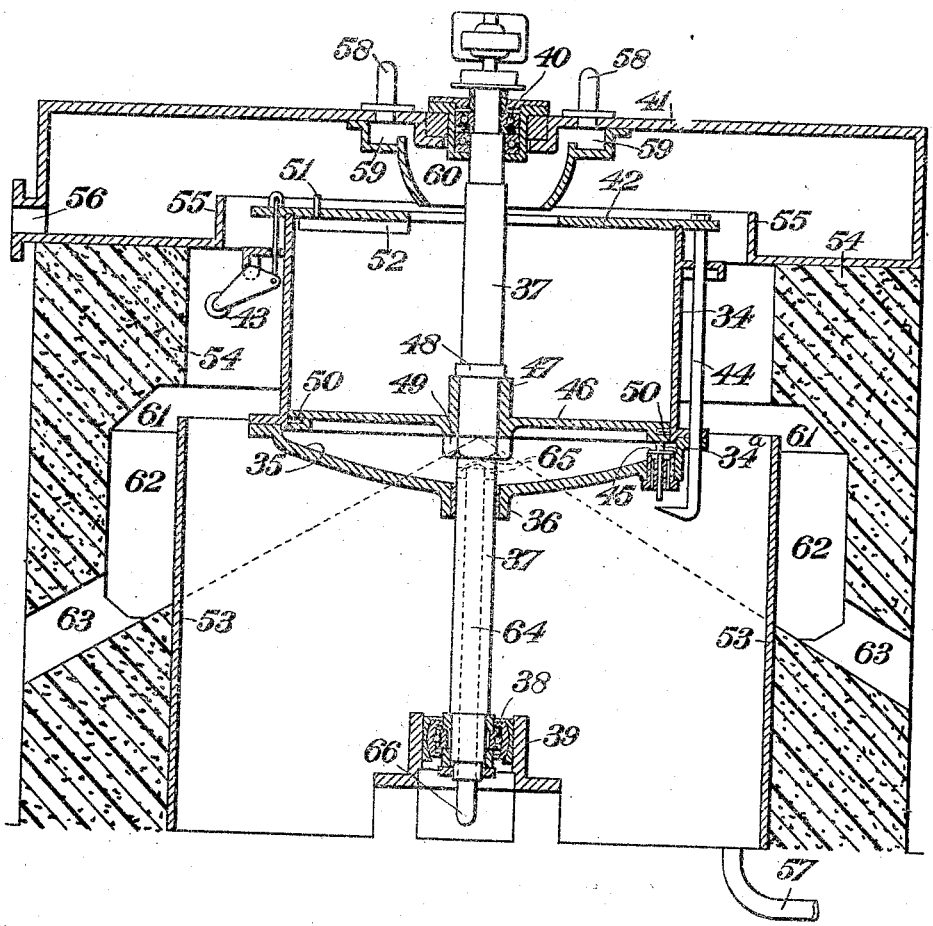

The invention is illustrated by way of example in the accompanying drawings, in which Figure 1 shows in vertical section and Fig. 2 in plan view a centrifuge having an axially movable piston. Fig. 3 is a vertical section of a machine having an axially movable cylinder.

Figure 4:
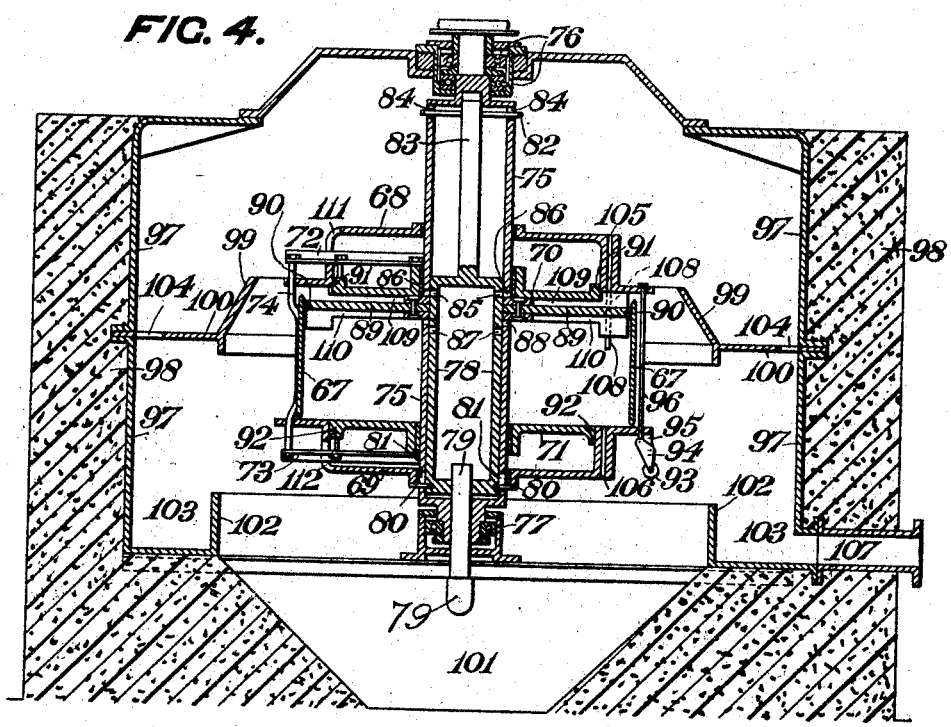
Figure 5:
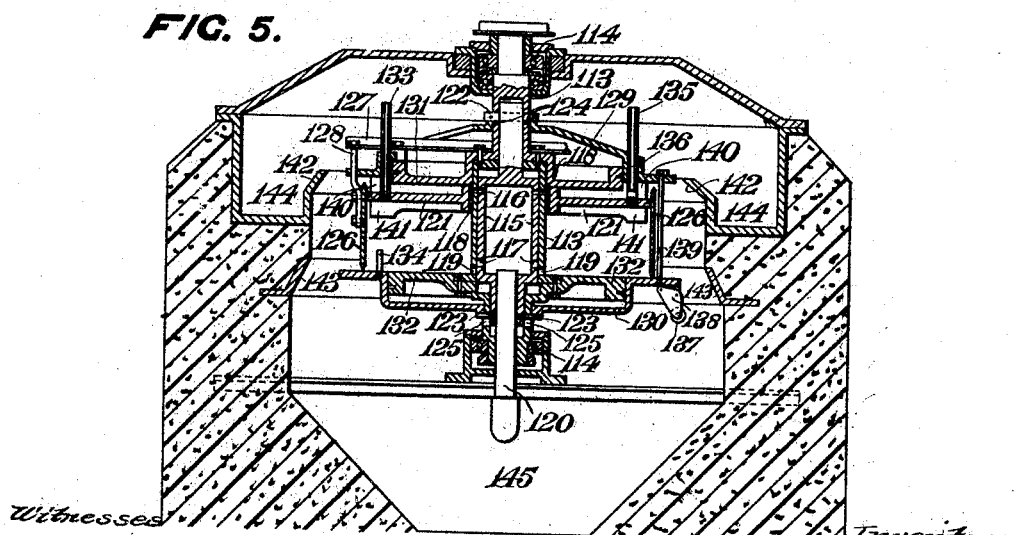

Fig. 4 is a vertical section of a double-acting machine having an axially movable cylinder, and Fig. 5 is a vertical section of a double-acting machine having an axially movable piston.

Referring to Figs. 1 and 2 the centrifuge is in the form of a rotating cylinder 1 in which a piston 2 is caused to move axially at requisite intervals to effect the separation and the consolidation and ejection of the solid substances.

The cylinder 1 is provided with a fixed cover 3 at one end, and at its opposite end with a movable cover 4.

5 is the driving shaft which may be made in one piece with the cover 3, and which is carried in bearings 6, 7, at its upper and lower ends respectively. The shaft 5 may be coupled directly, as shown, to an electric motor 8 by which it is driven rapidly, or it may be driven otherwise suitably. The piston 2 is a sliding fit upon said shaft 5.

The cover 4 is normally maintained closed by means of rods 9 one end of each of which is attached to the cover and the other end is connected to a bell-crank lever 10 pivoted at 11 to a flange 12 formed on or attached to the cylinder 1; such bell crank levers each carrying at its outer or free end a centrifugal weight 13. The levers 10 allow of a limited opening movement of the cover 4 in order to give passage to the solid substances as described hereafter.

14 is the casing of the machine which is formed with an annular trough 15, for the reception of the clarified liquor, the inner wall of which is inclined toward the axis of the machine, and 16 is the top plate of the machine which is apertured as at 17, 17, through which the pipes 18, 18, deliver the liquid to be treated.

Below said top plate 16 is an annular trough 19 which surrounds and is formed in one with an inverted truncated conical neck 19ª whereby the liquid to be treated is introduced through a central aperture 20 in the cover 4; or any other suitable means for evenly distributing the entering liquid may be adopted. In said cover 4 are a number of apertures in each of which an upwardly projecting tube 21 is fitted to serve as a means of exit for the liquid from which the solids have been separated.

At the bottom of the machine and projecting axially into the boss 22 of the fixed cover 3 is a pipe 23 which communicates with the rear of the piston 2 by means of a chamber 24 in said boss 22 and apertures 25, 25, leading to the space formed between the dished cover 3 and the underside of the piston 2. This pipe 23 communicates with a supply of liquid which is adapted to be admitted to the underside of the piston 2 to raise same.

In the cover 3 there are arranged one or more valves 26 controlling one or more exhaust pipes 27 whereby the body of liquid admitted to the rear of the piston 2 may be released when required. Each valve 26 is opened automatically by means of a valve rod 28 carried by the movable cover 4 and whereof the toe 29 is adapted to engage the valve stem 30 of the valve 26 at the appropriate time.

The lower portion of the casing 14 which surrounds the cylinder 1 receives the solid substances as they are discharged from the cylinder, suitable means, not shown, being provided for the collection and removal of such solid substances.

The pipes 18 and 23 are provided with suitable valves for the control of the liquid supplied thereby to the machine, and the trough 15 is formed with an outlet aperture 31 to which appropriate connections may be made for the conveyance away from the machine of the clarified liquor.

The liquid supplied by the pipe 23 may either be the liquid under treatment, or other liquid, the connections for the conveyance of same being made in accordance with the mode of supply adopted.

In operation, the motor 8 is started and the machine is rotated. The liquid to be treated is admitted through the pipes 18, 18, whereby it is delivered into the annular trough 19 the inner wall of which serves as a weir over which the liquid flows down the inverted truncated conical neck 19$^a$ and passes through the aperture 20 in cover 4 into the cylinder 1, falling in the form of an annular stream onto the conical deflector or boss 2$^a$ attached to or formed upon the piston 2.

By centrifugal force the liquid is propelled toward the cylinder wall and gradually fills up the machine; the solid substances in suspension in the liquid being separated therefrom and deposited on the inner surface of the cylinder wall.

As the liquid becomes clarified it is discharged through the pipes 21 and is propelled by centrifugal force from the mouths of said pipes into the annular trough 15 whence it is carried away as may be desired. In order to obtain a sufficient centrifugal head to pass the maximum volume of clarified liquor through the pipes 21, the supply of liquid to be treated is regulated so that a vertical wall or annular body of liquid extends from the plane of the vertical axes of the pipes 21 toward the edge of the aperture 20 in cover 4.

When it is desired to eject the solids from the machine, the supply of liquid flowing through the pipes 18, 18, is shut off, the aforesaid annular body of liquid rapidly escapes through the pipes 21 and trough 15 until only a comparatively small amount of the liquid remains. The valve controlling the pipe 23 is then opened and liquid is admitted through the apertures 25 in chamber 24 to the underside of the piston 2, and when the centrifugal head of the liquid below the piston preponderates over that acting in a downward vertical direction, the piston 2 rises.

The piston 2 is fitted with piston rings 32 which are divided or segmental and are so fitted in the peripheral groove in the piston that they are pressed against the cylinder wall by centrifugal force so as to maintain a good joint and so as to take up wear. The piston 2 is also provided with one or more upstanding webs or flanges 33 adapted to contact with the movable cover 4 as the piston approaches the end of its upward stroke. Similar flanges 33 also project downwardly from the cover 4.

As the piston 2 rises the solids deposited upon the cylinder wall are forced or pushed upward and the centrifugalizing space gradually becomes reduced so that the liquid remaining in it is ejected through the pipes 21 until eventually all this liquid is removed and only the solid substances remain.

As the piston rises farther these solid substances are compressed, and ultimately the upstanding webs 33 contact with the piston 2 and the cover 4 which is raised from its seat against the force exerted by the centrifugal weights 13. The solid substances are thereupon thrown out from the cylinder against the inclined inner wall of the trough 15 whence they fall to the bottom of the casing for collection and removal.

When the cover 4 approaches the limit of its lift the supply of liquid through the pipe 23 is cut off, by a connection between the cover and the controlling valve, or otherwise suitably, and the toe 29 of the valve rod 28 engages the valve stem 30 of the valve 26 raising the valve from its seat and allowing the liquid at the underside of the piston to be discharged through the pipe or pipes 27, such liquid being ejected into the collecting trough 15 or to another suitable means for its collection.

After the raising liquid has been discharged, the cover 4 is closed by the centrifugal weights 13, which force the piston down a short distance where it is temporarily retained by the outward pressure exerted by the piston rings 32.

As soon as the cover 4 is closed, the valve rod 28 disengages from the valve stem 30, and the valve 26 is closed by the contact of the piston 2 with an upwardly projecting stud 34 formed on the upper side of the valve. The liquid to be treated is then admitted to the machine, the piston gently descends and the cycle of operations already described are repeated.

Referring now to Fig. 3 in which a machine having an axially movable cylinder and a relatively stationary piston is shown.

34 is the cylinder which is attached by a lower peripheral flange to and carried by a dished bottom 35 having a boss 36 adapted to slide upon and rotate with the shaft 37 which is supported by a lower bearing 38 carried by a footstep 39 and which is also supported by an upper bearing 40 mounted in a recessed portion of an upper casing 41.

The cylinder 34 is provided with a removable cover 42 controlled by centrifugal weights 43 and also carries and operates a valve rod 44 controlling the opening of a valve 45 to allow the escape of liquid from below the piston 46, all as already described with reference to Figs. 1 and 2.

The piston 46 is mounted by a boss 47 below a collar 48 upon the shaft 37 and is held against said collar by a nut 49 screwed on a screw threaded portion of the shaft. Or said piston may be mounted on shaft 37 otherwise suitably. The piston is also fitted with segmental piston rings 50.

The cover 42 is formed with a central opening and is provided with pipes 51 for the discharge of the clarified liquor and with downwardly projecting webs or flanges 52 to contact with the piston 46 and to raise the cover 42 off its seating.

Below the cylinder (when in its uppermost position) and surrounding same there is a circular trough 53 which is arranged in a suitable setting 54 or is otherwise supported, and the aforesaid upper casing 41 is disposed above the cylinder and is also carried by said setting, or otherwise suitably; said upper casing 41 being provided with an upstanding inner flange 55 and with a discharge aperture 56. This casing 41 serves to collect the clarified liquor discharged by the pipes 51. A drain pipe 57 is arranged at the bottom of the trough 53.

58, 58, are the pipes for the introduction into the machine of the liquor to be treated which is delivered into an annular trough 59 carried by and below the top plate of the casing 41 and formed in one with an inverted truncated conical neck 60, adapted to deliver said liquid to be treated through the central aperture in the cover 42.

As already stated, the cylinder 34 is adapted to be displaced axially and at a point level with the upper edge of the cylinder, when the latter is in its lowermost position, the setting 54 is formed with a circular recess 61, having an inclined side, for the reception of the solid substances when ejected from the machine; such recess 61 communicating by a vertical prolongation 62 with a downwardly inclined passage or chute 63 for the conveyance of said solid substances from the machine.

Other means may however, if desired, be employed for the collection and conveyance of said solid substances from the machine.

The shaft 37 is tubular from its lower end up to a point above the bottom 35 of the cylinder and the passage 64 thus formed communicates with the space between the underside of the piston 46 and said bottom 35 by means of radial ways 65 formed in the shaft. A valve controlled pipe 66 is coupled to the lower end of the shaft 37 and serves to admit liquid to the aforesaid space.

In the operation of this construction of machine, the liquid to be treated is admitted to the cylinder in the same manner as that already described with reference to Figs. 1 and 2. It overflows, as before, through pipes 51 into the casing 41. When it is desired to remove the deposit of solid substances the supply of liquid to be treated is stopped, the liquid remaining in the cylinder draining away to the level of the pipes 51. The valve controlling the supply of liquid to the pipe 66 is opened admitting liquid between the piston and the bottom cover 35. The pressure of liquid so admitted ultimately preponderates over the forces holding up the cylinder, which therefore descends. As the centrifugalizing space becomes less, the liquid remaining in the cylinder further drains away through the pipes 51 and is discharged against the casing 54, whence it eventually drains away through pipe 57. The solid substances are scraped off the cylinder wall by the piston 46, and are consolidated until the cover 42 is caused to open by contact of the webs or flanges 52 with the piston.

On the raising of the cover 42 from its seating the solid substances are ejected from the mouth of the cylinder into the circular recess 61, and the valve or valves 45 is or are opened by the rod or rods 44 allowing the liquid admitted to the rear of the piston to escape into the trough 53 whence it flows away through the drain pipe 57.

After all the raising liquid has been discharged, the cover 42 is closed by the centrifugal weights 43. A further supply of liquid to be treated is then admitted to the machine and gradually forces the cylinder upward again to its topmost position. The machine is then run until the desired quantity of solid substances have accumulated upon the cylinder wall, and, without stopping the machine, said solid substances are consolidated and ejected as already described.

Referring now to Fig. 4 in which a double-acting machine having an axially movable cylinder is shown.

67 is the cylinder which is provided with outer covers 68, 69, that slide on inner covers 70, 71, to which latter covers the cylinder is attached as by means of angle irons 72, 73 and rods 74.

The covers 68, 69, 70 and 71 are mounted so as to be slidable upon the hollow shaft 75 which is supported in bearings 76, 77, and which is provided internally with a piston valve 78 into which a delivery pipe 79 projects.

The valve 78 is provided at its lower end with laterally projecting cotters 80, 80, which pass through slots 81, 81, in the shaft 75 and are adapted to be engaged by the cover 69. Similar cotters 82 project laterally from the valve stem 83 through slots 84, 84, at the upper end of the shaft 75 and are adapted to be engaged by the cover 68.

The valve 78 is provided with ports 85, 85, which are adapted to register with corresponding ports 86, 86, in the shaft 75, and said valve is also provided with ports 87, 87, adapted to register with corresponding ports 88, 88, in the shaft; the ports 86 serving to admit the liquid to be treated to the upper side of a piston 89 carried so as to rotate with but not move axially of the shaft 75, and the ports 88 serving to admit the fluid to be treated to the underside of said piston 89.

The piston 89 is provided with segmental piston rings 90, and the covers 70 and 71, are respectively provided with similar rings 91, 92.

The outer covers 68, 69, which seat upon the ends of the cylinder 67 are controlled by centrifugal weights 93 carried by levers 94 pivoted to lugs 95 and also to rods 96.

97 is the casing of the machine which may be arranged in a setting 98, and 99 is a truncated conical shield which is carried by a medial horizontal partition 100 and which serves to deflect solid substances downwardly into the chute or trough 101 as they are ejected from the cylinder 67. 102 is an upstanding circular flange at the upper end of the trough 101 and with the casing 97 this flange forms an annular channel 103 for the reception of the clarified liquor. The partition 100 is provided with apertures 104 whereby the clarified liquor that escapes from the apertures 105 in the cover 68 may pass to the channel 103. Similar escape apertures 106 are formed in the cover 69.

107 is a drain pipe whereby the clarified liquor is carried away from the machine; and 108 is a rod which projects from both sides of the piston 89 and is adapted to enter the aperture 105 or 106 at the appropriate time.

The piston 89 is provided at its upper face with upstanding webs or flanges 109, 109, which are deeper at their marginal portions than at their inner portions in order that said webs or flanges may contact with the cover 86 before they contact with the cover 70 as the cylinder 67 is about to complete its downward travel; the purpose of such contact being to raise the cover 68 from off its seating in order to enable the accumulation of solid substances to be ejected. Similar webs or flanges 110, 110 project from the lower side of the piston 89. The cover 68 is slotted at 111 and the cover 69 is slotted at 112 in order to permit movement of same relatively to the cover 70 and the cover 71 respectively.

The method of operation of this construction of the machine is as follows:—

The valve 78 receives the liquid to be treated from the supply pipe 79 and alternately distributes same to the upper and lower sides of the piston 89 by means of the pairs of apertures 85, 86 and 87, 88 respectively, when said pairs of apertures are in coincidence.

In the position shown in Fig. 4 the deposit of solid substances at the upper side of the piston 89 has just been discharged and the supply to the lower side of the piston of liquid to be treated has just been cut off.

The apertures 85, 86, are in coincidence but the supply of liquid to be treated cannot commence to be admitted above the piston 89 until the movable cover 68 is drawn back to its seating on the cylinder 67 by the centrifugal weights and levers 93, 94. This movement of the cover 68 cannot take place until the clarified liquid below the piston 89 drains away through the escape aperture 106, being thrown out by centrifugal force into the channel 103 and passing away by the pipe 107. When all the liquid has thus drained away from below the piston 89 the force holding the cylinder 67 in its lowermost position becomes inferior to the force exerted by the centrifugal weights 93 on the cover 68 and when this occurs the cover 68 is drawn onto its seating and in so doing presses on the webs or flanges 109 and raises the cylinder 67 and consequently also the inner cover 70 sufficiently to cause the boss of the cover 70 to rise above the apertures 86, 86, and permit the liquid to be treated to enter the space above the piston 89.

The cylinder 67 now gradually ascends; the solid substances in the incoming liquid being deposited on the cylinder wall above the piston 89, and the accumulation of solid substances already deposited on the cylinder wall below the piston being gradually consolidated against the underside of the piston.

When the rod 108 comes clear of the passage 105 in cover 68 the clarified liquid commences to escape from above the piston, and as the cylinder approaches the limit of its upward travel the lower end of said rod 108 enters the passage 106.

On the further upward movement of the cylinder the deeper marginal portions of the webs or flanges 110, 110, contact with the cover 69 and move it from its seating, allowing the solid substances to be ejected and to fall into the trough 101.

As the cylinder 67 is about to complete its upward movement the boss of the cover 68 contacts with the lugs 82, 82, and, raising the valve 78 cuts off the supply of liquid to the upper side of the piston 89.

This upward movement of the valve 78 causes the apertures 87, 88, to be brought into coincidence but the liquid does not enter the space below the piston at once owing to the apertures 88, 88, being covered by the boss of the lower inner cover 71.

The fresh supply of liquid to the lower side of the piston is introduced in the same way as described already with reference to the upper side of the piston and the cycle of operations proceeds continuously.

Fig. 5 shows another form of double-acting machine in which the piston reciprocates relatively to the cylinder.

In this view 113 is the hollow shaft supported in bearings 114, 114, and having an internal reciprocable valve 115; the valve being apertured at 116, 116, and 117, 117, and the shaft at 118, 118, and 119, 119, respectively to admit the liquid to be treated from supply pipe 120 to one or other side of piston 121.

Reciprocation of the valve 115 is effected by cotters 122, 122, and 123, 123, respectively, projecting through slots 124, 124, 125, 125, in the shaft 113.

126 is the cylinder which is attached to the shaft 113 by suitable fixings 127, 128, and is provided with outer covers 129, 130, and inner covers 131, 132, as in Fig. 4.

133 is a pipe for the escape of the clarified liquor from the underside of the piston and 134 is a spigot or plug to enter same when the piston is in the lower position.

135 is a similar pipe for the escape of clarified liquid from above the piston and 136 is an aperture in the lower end of the pipe whereby the liquor enters same.

The covers 129 and 130 are controlled by the centrifugal weights 137 on levers 138 connected to rods 139.

The piston 121 is provided above and below with webs or flanges 140, 140, and 141, 141, similar to those already referred to.

142 and 143 are truncated conical deflectors for diverting the solid substances ejected respectively from above and from below the piston.

144 is an annular trough for the collection of the clarified liquor, and 145 is a sump for the collection of the solid substances.

The operation of this construction is as follows:—

In the position shown in Fig. 5 the upper portion of the cylinder has just discharged the solid substances and the supply of liquid to the lower portion of the cylinder has just been cut off. The apertures 116, 116, and 118, 118, are in coincidence and are covered by the boss of the piston 121.

When the liquid in the lower part of the cylinder has drained away through the pipe 133 the force holding the piston up becomes inferior to the downward pull of the levers 138 and the upper outer cover 129 closes and forces down the piston 121 a sufficient distance to uncover the apertures 118, 118.

The liquid now enters the upper portion of the cylinder and gently forces down the piston. As soon as the aperture 136 in the outlet pipe 135 comes clear of the movable cover 129, the clarified liquor escapes through said pipe into the annular collecting trough 144 whence it is carried away by suitable pipes.

While the piston descends it pushes upon the solids which were previously deposited on the lower wall of the cylinder. These bank up and the liquid portion continues to drain through outlet pipe 133 until the projecting stud 134 enters and stops it up.

When the ribs 141, 141, on the underside of the piston come in contact with the movable cover 130 it is forced open against the pull of the levers 138. The solids discharge through the opening thus formed striking the annular deflector 143, whence they fall and are removed by some suitable means. At the same time the movable cover 130 presses down the cotters 123. This closes the feed to the upper portion of the cylinder, and places the apertures 117 and 119 in position for feeding the lower portion of the cylinder which can not take place until the movable cover 130 closes. This occurs when the liquid in the upper portion of the cylinder drains away through outlet pipe 135. The cycle is then repeated.

The feed is continuous, no external valves being required for operating the machine.

The centrifugal pressure of the liquid or liquids may also be applied to other types of centrifugal machines to actuate filling or discharging gear, through pistons, or other suitable means, which may be placed radially or in any other direction in relation to the axis of the machine.

By means of this invention the solid substances which by centrifugal force become separated from the liquid under treatment and are deposited upon the walls of the cylinder may be consolidated and ejected in continuously repeated cycles without the necessity of stopping the machine.

What we claim is:—

1. The herein described method of separating solids from liquids and ejecting the separated solids, which comprises submitting the mixed liquid and solids to the centrifugal action to effect separation of the solids from the liquid and consolidation of the solids, and ejecting the separated solids by submitting a body of liquid to centrifugal force to develop a pressure thereon.

2. The herein described method of separating solids from liquids, which comprises submitting the solids while under centrifugal pressure, to compression between a piston and a movable end of a cylinder to squeeze the liquid therefrom.

3. The herein described method of separating solids from liquids which comprises submitting the solids while under centrifugal pressure to further compression between a piston and a movable end of a cylinder, and imparting movement to said piston by pressure produced in a liquid by centrifugal force.

4. A centrifugal separating machine comprising a revoluble container for the material to be separated, a piston movable axially relatively to the container under the influence of one body of the material under treatment and adapted to receive at a side thereof another body of the material to be separated.

5. A centrifugal separating machine comprising a revoluble cylinder, and a part movable relatively to the cylinder and in a direction axially thereof by pressure developed by centrifugal force in bodies of liquid contained in spaces between the opposite sides of said movable part and the cylinder.

6. A centrifugal separating machine having a piston adapted to be moved relatively to a cylinder by means of the pressure set up by centrifugal force in a body of liquid admitted to one side of the piston, for the said purpose of creating a centrifugalizing space; and also adapted to be moved by means of the pressure set up by centrifugal force in another body of liquid admitted to the other side of said piston, for the purpose of effecting the consolidation and ejection of the solid substances, all without stopping the machine.

7. A centrifugal separating machine comprising a revoluble cylinder, a part movable axially therein, said part providing spaces at its opposite sides to contain bodies of liquid, a movable cover for closing the space at one side of said part, and means for introducing a liquid into the space at the opposite side of said part, the pressure developed in said latter liquid by centrifugal force acting to move said part toward said cover.

8. A centrifugal separating machine comprising a revoluble cylinder, a part movable therein and providing spaces at its opposite sides to contain bodies of liquid, means for introducing a liquid into the space at one side of said part to cause movement of said part by pressure developed in said bodies of liquid by centrifugal force, a cover for said cylinder arranged at the opposite side of said movable part, and centrifugally acting means for normally retaining said cover in closed position in opposition to the pressure developed by centrifugal force in the body of liquid at the respective side of said movable part.

9. A centrifugal separating machine comprising a revoluble container, a member relatively movable therein and providing spaces at opposite sides thereof for bodies of liquid, means for introducing a liquid into the space at one side of said member to cause movement of said member by pressure developed in said liquid by centrifugal force, a cover for closing the space at the opposite side of said movable member, links operatively connected to said cover, and weights operatively connected to said links and active centrifugally to normally retain said cover in closed position.

10. A centrifugal separating machine comprising a revoluble cylinder, a piston reciprocable axially therein and providing spaces at opposite sides thereof to contain bodies of liquid, means for introducing liquid into the space at one side of said piston to cause movement of the latter in one direction by pressure developed in said liquid by centrifugal force, a movable cover for closing the space at the opposite side of said piston, said latter space adapted to contain the liquid and solids to be separated, means operative by centrifugal force to normally retain said cover in closed position, the cover being displaceable by said movement of the piston to eject the separated solids from the cylinder, and packing rings on the piston operative centrifugally to engage the interior of the cylinder.

11. In a centrifugal separating machine, the combination of a revoluble cylinder, a piston movable axially therein and providing spaces at its opposite sides to contain respectively the liquid and solids to be separated and an actuating liquid for the piston, means for introducing the actuating liquid into the space at one side of the piston, a valve for discharging the actuating liquid from its respective space, a movable cover for retaining the separated solids in the space at the opposite side of the piston, said cover being displaceable by the piston to eject the separated solids, and means actuated by said cover for automatically opening the actuating liquid discharge valve.

12. In a centrifugal separating machine, the combination of a revoluble cylinder, a piston movable axially therein and providing spaces at its opposite sides to contain respectively the liquid and solids to be separated and an actuating liquid for the piston, means for introducing the actuating liquid into the space at one side of the piston, said liquid being operative by the pressure developed centrifugally therein to move the piston in one direction, a valve for discharging the actuating liquid from its respective space, a movable cover closing the space at the opposite side of the piston and serving normally to retain the solids in said space during the centrifugal separation of the solids from the liquid, said cover being movable into a position to permit discharge of the separated solids by said piston, and means operative automatically by the cover for opening the discharge valve for the piston actuating liquid when said cover is opened.

13. The combination in a centrifugal separator of a separating vessel, a partition therein and means adapted to deliver the materials to be separated to one side and the other of said partition alternately.

14. In a centrifugal separator, the combination of a separating vessel, a reciprocating partition therein, and means to guide the inflowing materials to each side of said partition alternately.

15. In a centrifugal separator the combination of a separating vessel, a partition therein and automatic means adapted to supply the materials to be separated to one side and then to the other side of said partition alternately in accordance with the movements of said partition.

16. The combination in a centrifugal separator of a separating vessel and a movable partition therein adapted to eject the separated solids from each end of said vessel alternately.

In testimony whereof we have hereunto set our hands in the presence of two subscribing witnesses.

JOHN HUGHES.
WILLIAM OWEN TRAVIS.
ROBERT ALEXANDER STURGEON.

Witnesses:
EUSTACE HENRY BARKER,
FREDERICK SKILTON.

Copies of this patent may be obtained for five cents each, by addressing the "Commissioner of Patents, Washington, D. C."